(12) United States Patent
Sherman, II

(10) Patent No.: US 7,475,759 B1
(45) Date of Patent: Jan. 13, 2009

(54) DISC BRAKE

(75) Inventor: William E. Sherman, II, South Bend, IN (US)

(73) Assignee: Robert Bosch, GmbH, Stuttgart (DE)

( * ) Notice: Subject to any disclaimer, the term of this patent is extended or adjusted under 35 U.S.C. 154(b) by 385 days.

(21) Appl. No.: 11/425,235

(22) Filed: Jun. 20, 2006

(51) Int. Cl.
*F16D 65/02* (2006.01)

(52) U.S. Cl. .................. 188/73.39; 188/73.46

(58) Field of Classification Search ............. 188/1.11 E, 188/1.11 L, 1.11 R, 73.36–73.44, 250 B, 188/250 G
See application file for complete search history.

(56) References Cited

U.S. PATENT DOCUMENTS

| | | | |
|---|---|---|---|
| 3,983,969 A | 10/1976 | Colpaert et al. | |
| 4,051,097 A | 9/1977 | Aldrich | |
| 4,173,681 A | 11/1979 | Durrieu et al. | |
| 4,200,173 A | 4/1980 | Evans et al. | |
| 4,373,615 A | 2/1983 | Melaniet | |
| 4,428,461 A | 1/1984 | Warwick | |
| 5,279,394 A * | 1/1994 | Wollenweber et al. | .. 188/1.11 E |
| 5,320,200 A | 6/1994 | Hashimoto | |
| 5,396,972 A | 3/1995 | Grele | |
| 5,509,508 A | 4/1996 | Evans | |
| 5,515,950 A | 5/1996 | Kwolek | |
| 5,975,252 A * | 11/1999 | Suzuki et al. | ............... 188/73.1 |
| 6,189,659 B1 * | 2/2001 | Doi et al. | .................. 188/73.35 |
| 6,378,666 B1 * | 4/2002 | Yoko | ........................ 188/73.38 |
| 6,454,056 B1 | 9/2002 | Iida | |
| 6,578,680 B1 | 6/2003 | Bosco et al. | |
| 6,668,983 B2 * | 12/2003 | Drennen et al. | .......... 188/181 T |
| 6,935,470 B1 | 8/2005 | Smith | |
| 6,955,247 B2 | 10/2005 | Renauld | |
| 6,994,190 B1 | 2/2006 | Gotti et al. | |
| 7,040,464 B1 | 5/2006 | Andrews et al. | |
| 7,331,427 B2 * | 2/2008 | Mohr | ..................... 188/1.11 E |

* cited by examiner

*Primary Examiner*—Christopher P Schwartz
(74) *Attorney, Agent, or Firm*—Leo H. McCormick, Jr.; Sarah Taylor

(57) ABSTRACT

A disc brake for a vehicle wherein first and second friction member have projections thereon that are located in grooves in first and second rails of an anchor. On movement of the first and second frictions members during a brake application, the projections slide in the grooves to maintain a parallel alignment between a braking surface thereon and radial braking surfaces on a rotor and at the same time transmit reactions forces into a rotor to oppose the rotation of the rotor. Braking surfaces on the projections engage the rotor to assist in opposing the rotation of a rotor during each brake application.

5 Claims, 5 Drawing Sheets

DISC BRAKE

This invention relates to a disc brake wherein first and second friction members each of which have projections thereon that are retained in grooves in an anchor to align engagement surfaces thereon with a rotor and to transmit reaction forces into an anchor during a brake application.

BACKGROUND OF THE INVENTION

U.S. Pat. Nos. 4,044,864; 4,219,106; 4,200,173; 4,335,806 and 5,551,537 are typical prior art disc brakes which have an anchor with support surfaces or rails therein that are spaced apart from each other to receive ears on carrier members that slide on the rails to guide first and second friction pads toward a rotor and carry reaction forces into the anchor to resist the rotation of the rotor during a brake application. While the shape of a carrier member may be different as illustrated in U.S. Pat. Nos. 5,396,972; 6,578,680 and 6,994,190 all such carrier members are normally made from steel or iron having a compatible co-efficient of friction with materials of the anchor such that during a brake applications excessive wear does not occur. Unfortunately, in some instances a slipper or sleeve member may be required to be placed between the ears and anchor to reduce wear and provide a co-efficient of friction that does not effect the movement during a brake application. In evaluating disc brakes, it is estimated that the weight of the carrier members may account for up to one percent of a disc brake and this invention discloses that the overall weight of a disc brake could be reduced by eliminating the carrier members while functioning in an equivalent manner.

SUMMARY OF THE INVENTION

The present invention discloses a disc brake wherein peripheral projections extend from the friction member, are received in guides on an anchor to align braking surfaces thereon with a rotor and directly communicate reaction forces into an anchor during a brake application.

In more particular detail, the disc brake has an anchor that is fixed to a housing of a vehicle with spaced apart first and second rails each of which have grooves therein to receive the projections and align a braking surfaces on the first and second friction members with first and second radial braking surfaces located on opposite sides of a rotor. The friction members are made from a semi-metallic material and the projections have a shape that corresponds to the grooves in the anchor. A caliper is connected to the anchor through pins that are attached to ears that extend from a caliper housing to align a bore and piston retained therein and arms that span the rotor with the first and second rails. In response to an operator input, pressurized fluid is presented to the bore that acts on the piston to move the first friction member toward and into engagement with the first radial braking surface on the rotor and acts on the caliper housing to pull the arms and correspondingly the second friction member toward and into engagement with the second radial braking surface of the rotor to effect a brake application. The first and second friction members move toward the rotor during a brake application with the projections sliding in the grooves in the first and second rails to maintain a desired alignment between braking surfaces on the friction members and the braking surfaces while at the same time reaction forces generated in opposing the rotation of the rotor are directly carried through the projections into the anchor. In this disc brake, the piston and arms of the caliper are made of a material having a coefficient of friction that is different than either the rotor or the friction members. Should excessive wear occur in either the piston or arms as may happen over a period of time as a result of the engagement with the friction members with the anchor, a loosely retained first shield member is placed between the piston and first friction member and loosely retained second shield member is placed between the arms and the second friction members. The shield members are preferable made of a thin sheet of steel that would protect the piston and arms from wear as a result of numerous engagements with the friction members during an expected life of a friction member. In addition, each shield has a plurality of axial tabs each of which has a length that extend toward the rotor and which are designed to engage the rotor when the thickness of a friction member is reduced to a predetermined thickness to provide an audio indication of a remaining thickness of the friction member. If desired one or all of the tabs could be rolled to hold an electronic sensor such that on engagement with the rotor an electrical circuit is closed and an indicator activated to provide a visual indication of the thickness of the friction member.

An object of the present invention is to provide a disc brake with peripheral projections on first and second friction members that are received in grooves in an anchor to guide the friction members into engagement with a rotor and to carry reaction forces into the anchor to oppose the rotation of the rotor during a brake application.

A further object of this invention is to provide a disc brake having a phenolic piston through which an actuation force is applied to a friction member with a shield to attenuate wear between the piston and a friction member through repeated engagements that would occur during a projected life of the friction member.

DETAILED DESCRIPTION

Figure 1:
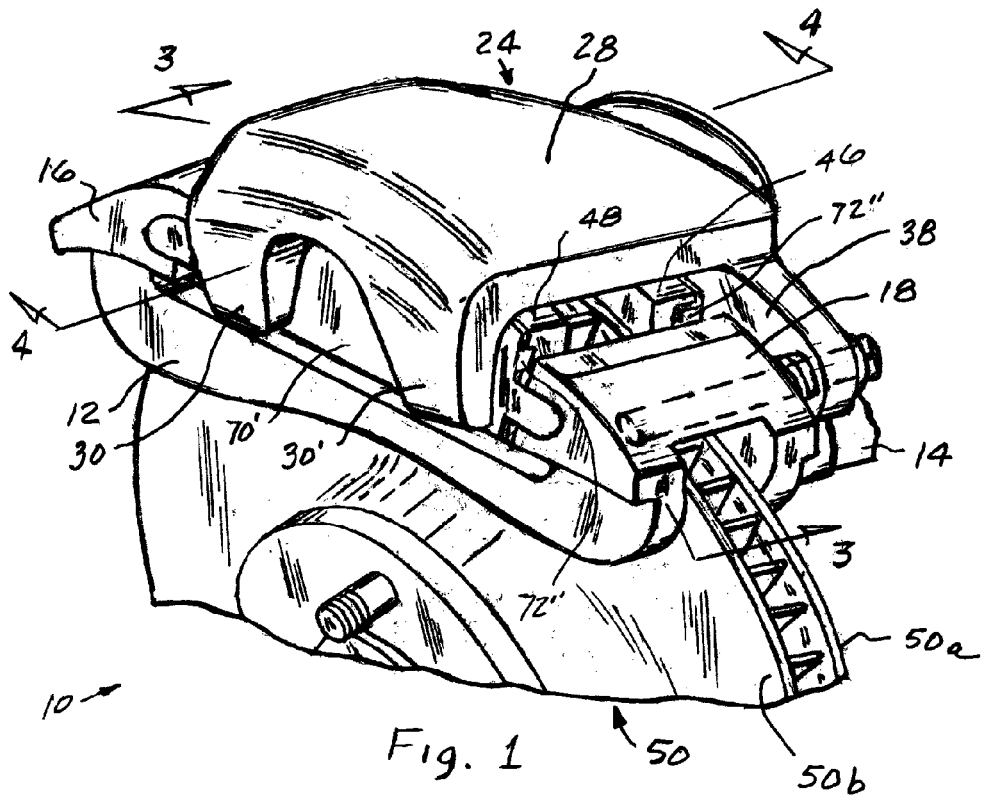
FIG. 1 is schematic illustration of a disc brake according to the present invention.
Figure 3:
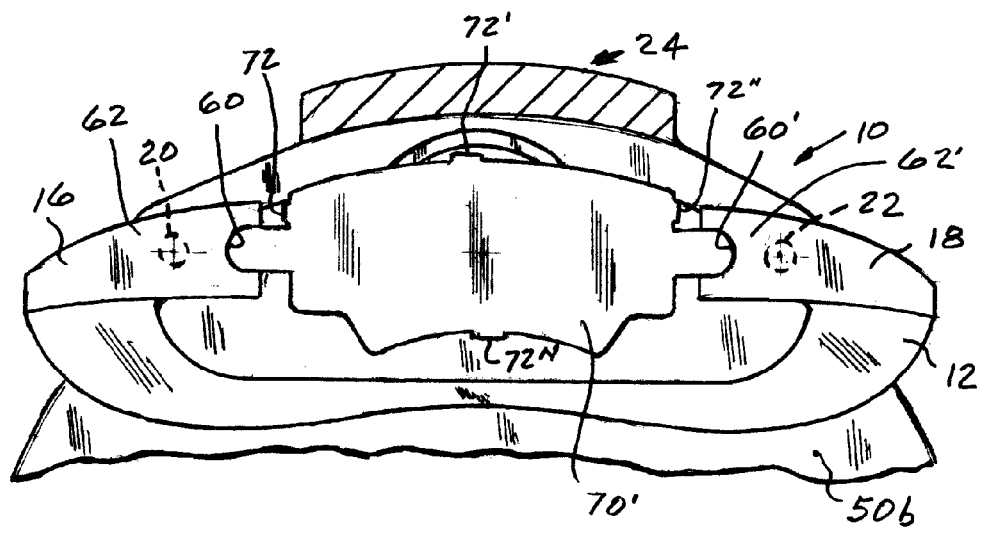
FIG. 3 is a sectional view taken along line 3-3 of FIG. 1.

In the specification where similar components are used in more than one situation the component may be identified by a number or a same number plus depending on a relationship with other components.

The disc brake 10 illustrated in FIGS. 1, 2, 3, 4 and 5 functions in a manner similar to disc brakes disclosed in U.S. Pat. Nos. 4,200,173 and 5,810,122 wherein an anchor or support member 12 is fixed to a knuckle 14 as disclosed in U.S. Pat. No. 5,988,761 for a brake system of a vehicle. The anchor or support member 12 for such disc brakes being distinguished by first 16 and second 18 spaced apart parallel rails and corresponding first 20 and second 22 parallel spaced apart bores and having an integral caliper 24 with a housing 26 that is separated from arms 30, 30' by a bridge 28 that spans a rotor 50. The caliper 24 being connected to the anchor 12 by guide pins 32, 32' that are respectively attached to ears 36 and 38 that extend from the caliper housing 26 and the first guide pin 32 is mounted to slide in the first bore 20 and the second guide pin 32' is mounted to slide in the second bore 22 in the support member 12. With the first 20 and second 22 bores being parallel to each other, the first guide pin 32 and the second guide pin 32' align face 46a on a first friction member 46 and face 48a on a second friction member 48 in a parallel relationship adjacent a first face 50a and a second face 50b on a rotor 50 that is connected to rotate with an axle of the vehicle. The housing 26 has a bore 40 in which a piston 42 is located to define an actuation chamber 44 that is supplied with pressurized fluid under the control of an operator. The first friction member 46 is connected to piston 26 while the second friction member 48 is connected to arms 30, 30'. When an operator desires to effect a brake application, pressurized fluid is supplied to an actuation chamber 44 of bore 40 that simultaneously acts on piston 42 and the bottom 41 of bore 40, to develop an actuation force that moves face 46a on the first friction member 46 toward and into engagement with face 50a and face 48a on the second friction member 48 toward and into engagement with face 50b of rotor to create a clamping force that retards the rotation of rotor 50 to effect a brake application. The clamping force created through the engagement of face 46a and face 48a with rotor 50 causes the first 46 and second 48 friction members to rotate in a direction of the leading edge engagement such that a reaction force corresponding to the clamping force applied to retard the rotation of rotor 50 is transmitted into either rail 16 or 18 of anchor 12 depending on the rotational direction of the rotor.

The clamping force is a function of the area of the engagement surface of the faces 46a on the first friction member 46 and face 48a on the second friction member 48 times the input force derived from the area of piston 42 times the pressurized fluid supplied to the actuation chamber 44. The area of the engagement surfaces of the first 46 and second 48 friction members includes the projections 47 and 49, see FIG. 2 and as a result provides an improvement over known disc brakes since the input force is applied over a larger area from a same level of pressurized fluid that is supplied to the actuation chamber 44.

In more particular detail, the disc brake 10 is characterized in that the first rail 16 of the anchor 12 has a first groove 60 and the second rail 18 of the anchor 12 has a second groove 60' therein. Each groove 60,60' having a semi-spherical shape that extends from a first side 62 to a second side 64 of the anchor 12 and in that the first friction member 46 and the second friction member 48 each have projections 47 and 49 that are respectively mated in the first groove 60 and second groove 60'. Thus, the shape of the projections and grooves allows reaction forces to be transmitted in a smooth manner into the rails 16, 18 without damage to the friction materials.

The first 46 and second 48 friction members are identical and made from a semi-metallic composition of material having a mixture that is generically defined by metal particles or metal oxide fibers, elastomers and modifiers retained in a matrix by a thermosetting resin. The resulting friction member having a substantially stable coefficient of friction up to 1000 degree Fahrenheit with a desired coefficient of friction and a strength in compression of at least 40,000 psi.

Figure 2:
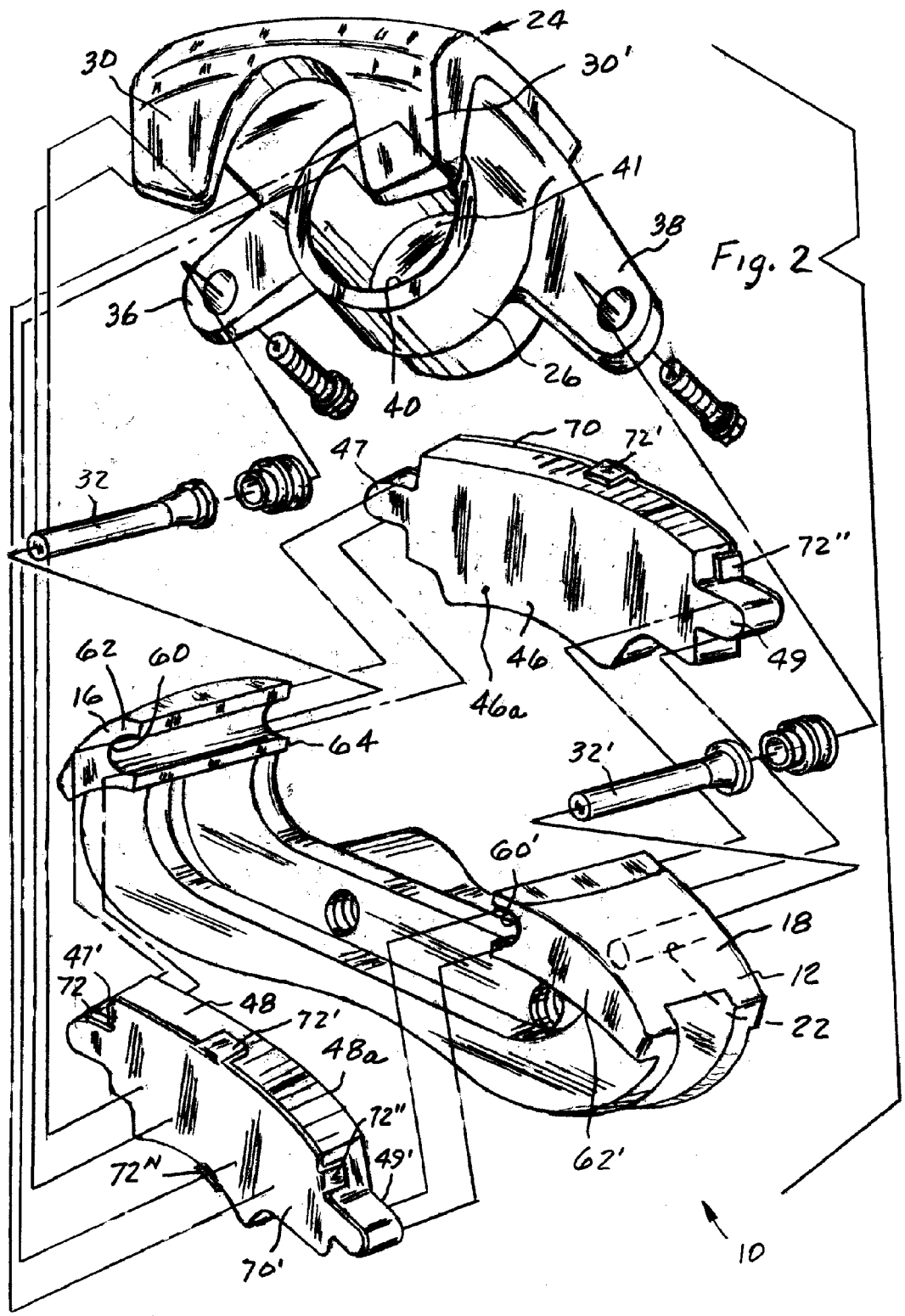
FIG. 2 is an exploded view of the component of the disc brake of FIG. 1.
Figure 4:
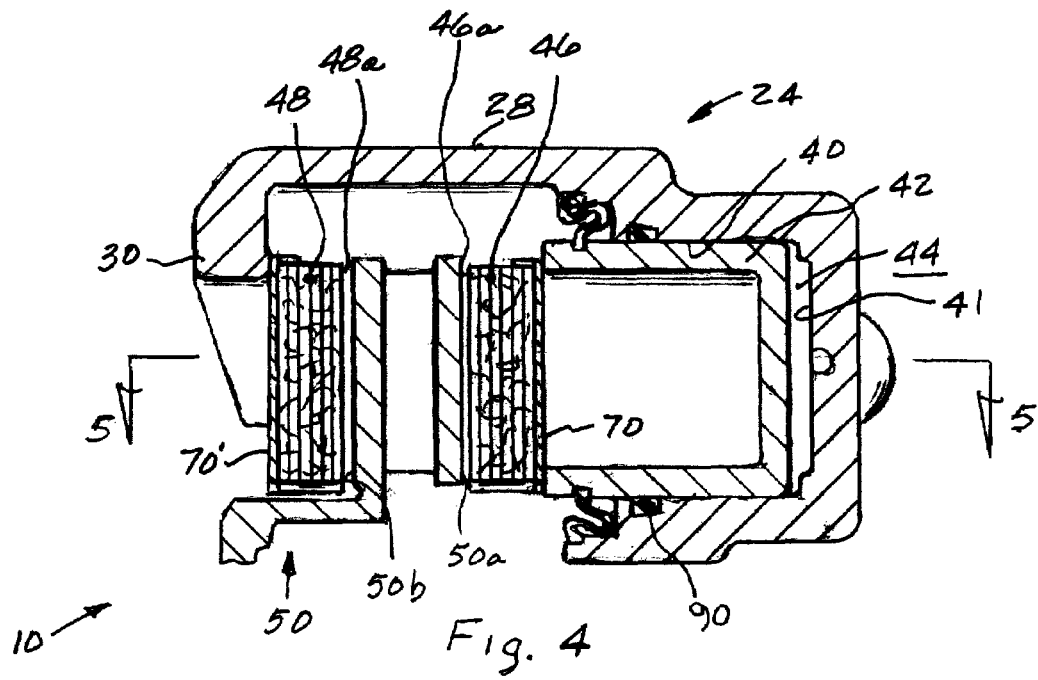
FIG. 4 is a sectional view taken along line 4-4 of FIG. 1.
Figure 9:
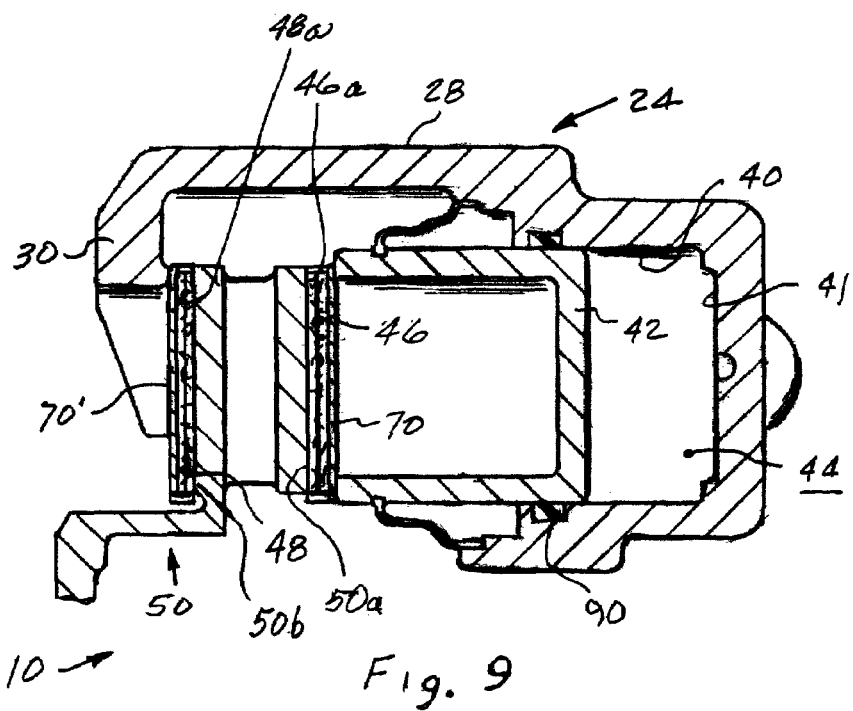
FIG. 9 is a sectional view of the disc brake of FIG. 8.

Each friction member 46,48, as best illustrated in FIG. 2, is further defined by having an arcuate shape with a uniform thickness with projections 47,49 having a semi-spherical shape corresponding to grooves 60,60' that extend there from.

The piston 26 for a disc brake is normally made from a phenolic material which has a lower coefficient of friction than either the caliper 12 or the friction members 46. In order to prevent scaring of the piston 26, a barrier or shield 70 is placed between the piston 26 and the friction member 46. The shield 70, as best shown in FIGS. 2, 3, 4 and 5 is defined by a sheet of metal having a thickness of 0.05 mm and a shape that matches the engagement surfaces 46a,48a of the friction members 46,48. The shield 70 is resiliently aligned on the friction members 46,48 by a plurality of tabs 72,72' . . . 72" that engage the sides of the friction members 46,48 at four points with tab 72 being located adjacent projection 47 and tab 72" being located adjacent projection 49. Tabs 72,72' . . . 72" each have a length that are a function of the compressive strength of the composition of material of the matrix of the friction members 46,48 but most often will be from about one fourth to one third the original thickness of the friction members 46,48. The end of the tabs 72,72" engaging the rotor 50 to provide a audible noise when the thickness of the friction material is worn to that thickness and may not have sufficient strength to carry a maximum reaction force into an anchor 12.

Figure 6:
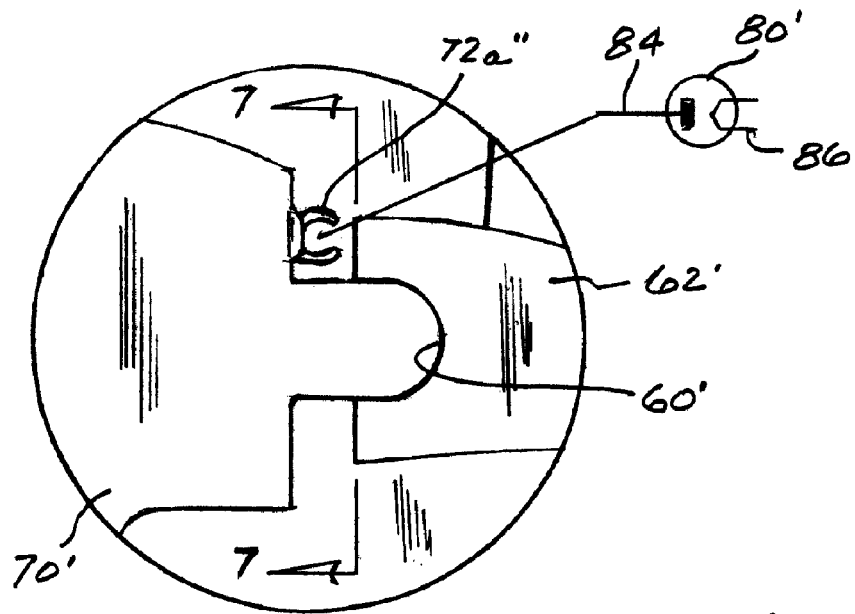
FIG. 6 is an enlarged view of an alternate embodiment of a portion of the shield of FIG. 3.
Figure 7:
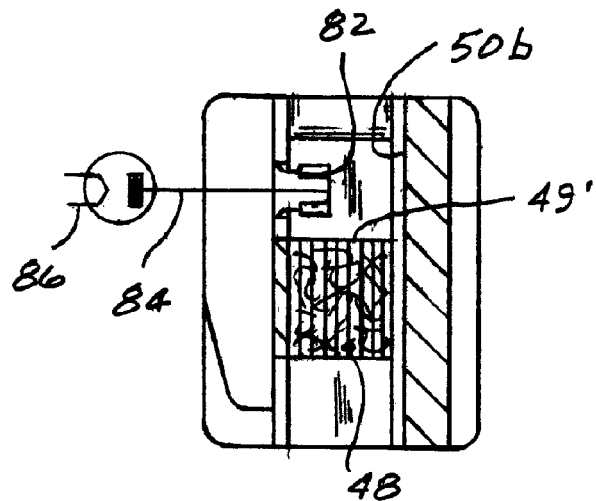
FIG. 7 is a sectional view taken along line 7-7 of FIG. 6.

Under some circumstances either or both tab 72a or tab 72a" may be rolled in a manner as illustrated in FIGS. 6 and 7 so as to retain a sensor 80, 80'. Sensor 80 is held by the tab 72a and sensor 80' would be held by 72a" such that when an end 82 thereon engages rotor 50 an electrical circuit 84 is closed and an indicator light 86 is activated to provide a warning that the thickness of a friction members 46, 48 has been reduced to a predetermined thickness and the area of the either projection 47 or 49 could be crushed or damaged from the transmission of a maximum reaction force into anchor 12.

Figure 5:
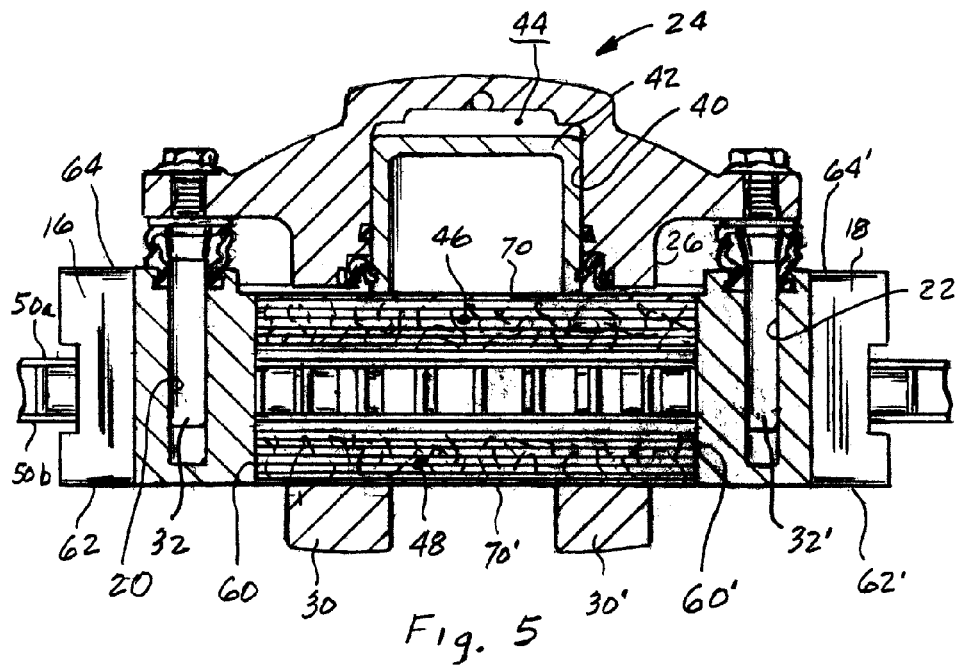
FIG. 5 is a sectional view taken along line 5-5 of FIG. 4.
Figure 8:
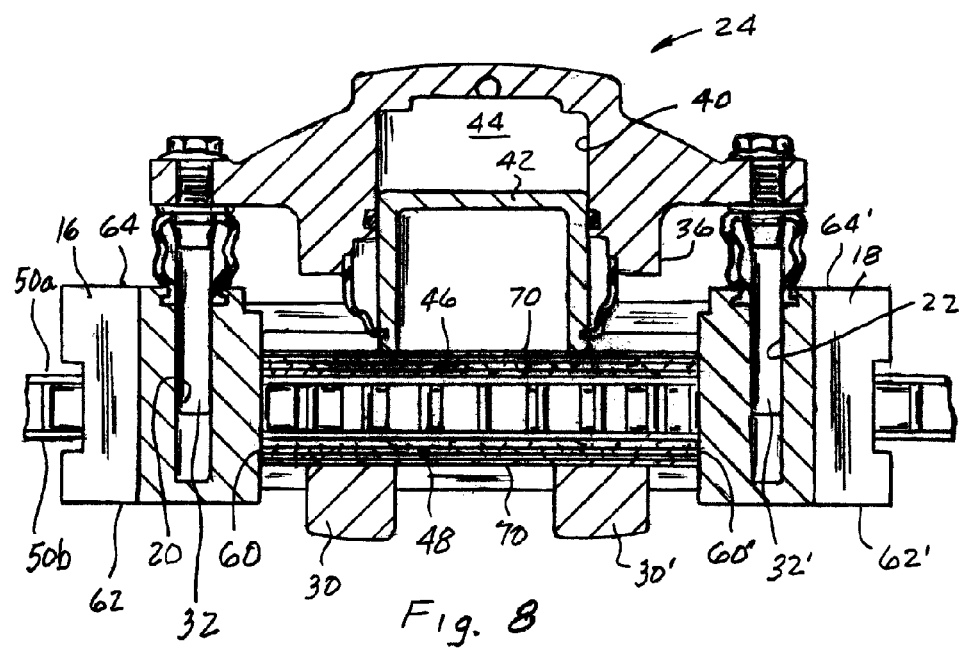
FIG. 8 is a sectional view of the disc brake of FIG. 5 after the friction material has worn to a predetermined thickness.
Figure 10:
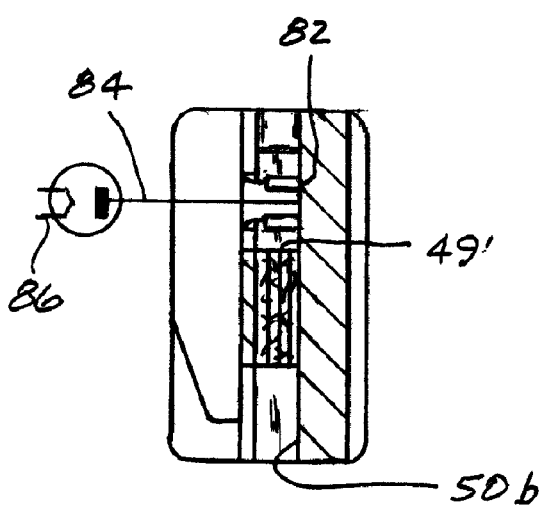
FIG. 10 is sectional view of the shield of FIG. 7 after the friction material has worn to a predetermined thickness.

When an operator desires to effect a brake application in a vehicle equipt with disc brake 10, pressurized fluid is supplied to actuation chamber 44 that acts on piston 42 to move the first friction member 46 toward and into engagement with brake surface 50a on rotor 50 and acts on the bottom of bore 41 to pull arms 30, 30' and the seconds friction member 48 toward and into engagement with brake surface 50b on rotor 50 to create a clamping force from which reaction forces are carried into anchor 12 by way of projections 47,47' or 49,49' depending on the direction of rotation of the rotor 50. As the first 46 and second 48 friction members move toward the rotor 50 projections 47, 47' and 49, 49' axially slide in grooves 60, 60' acutely rotate about the axis of the rotor 50 toward the anchor 12 to transmit the reaction forces into rails 20 and 22. The reaction force is spread over the axial surface area of projections 47, 47' or 49, 49' depending on the rotational direction of rotor 50. When the friction material has its original thickness as illustrated in FIG. 5, the reaction forces as transmitted through the projections 47, 47', 49, 49' is relatively low however as the thickness of the friction material decreases as a result of wear as illustrated in FIG. 8 the surface area decreases and as a result there is a corresponding increase in the unit of force transmitted through a projection. When this increase in force reaches the crushing force or force wherein a projection 47, 47', 49, 49' may bend, it is necessary to replace a friction member. The tabs 72, 72' that are located on the shield 70 are resiliently attached to a friction member 46,48, have a length that is selected such that end 82 thereof engage the rotor 50 to provide a audible warning when the thickness has been reduced to the predetermined thickness or with the second embodiment of FIG. 6 end 82 of sensor 80 contacts rotor 50 as illustrated in FIG. 10 to closes a circuit 84 and activated light 86 to provide a visual warning of such a reduction in thickness prior to a reduction in surface area where a crushing force could impede the transmission of a reaction force into the anchor 12 during a brake application.

On termination of the presence of pressurized fluid supplied to chamber 44, return seal 90 acts on piston 42 to move the first friction member 46 away from the rotor 50 to define a running clearance between faces 46a and surface 50a and face 48a and surface 50b such that rotor 50 may freely rotate.

It is further suggested that the projections 47,47',49,49' may be coated with an anti-oxidization agent to reduce the possibility of an increase in the sliding resistance in grooves 60,60' should the disc brake 10 be inactive for a period of time.

What is claimed is:

1. A disc brake for a vehicle including an anchor fixed to a vehicle having a first rail with a first bore therein that is spaced apart and parallel from a second rail with a second bore therein, a caliper having a housing retained on the anchor by a first pin that extends from a first ear and a second pin that extend from a second ears on the housing to align a piston retained in a bore therein with the first and second bores and arms that extend from the housing and span the rotor in a perpendicular relationship with the first and second radial surface on the rotor, said bore receiving pressurized fluid from a source and acting on the piston to move a first friction member and a first braking surface thereon toward and into engagement with the first radial surface and acting on the housing to pull on the arms and move a second friction member and a second braking surface thereon toward and into engagement with the second radial surface to create a clamping force that acts on the rotor and transmits a reaction force into the anchor to oppose the rotation of the rotor during a brake application, said disc brake being characterized in that the first rail has a first groove therein that is parallel with the first bore and the second rail has a second groove therein the is parallel with the second bore; and in that the first and second friction members each have a first projection that is located in the first groove and a second projection that is located in the second groove through which the reaction force is carried into the anchor; and in that the said first and second braking surfaces each have a face on said first and second projections that engages the rotor on each brake application to oppose the rotation of the rotor, said first and second grooves and said first and second projections each have a semi-spherical shape through which the reaction force is transmitted from the first and second friction members into the anchor, said brake disc being further characterized by a first shield located between said piston and said first friction member, said first shield protecting said piston from wear caused by repeated engagements with the first friction member and a second shield located between said arms and said second friction member, said second shield protecting said arms from wear caused by repeated engagement with the second friction member, said first shield having a first plurality of peripheral tabs that extend a fixed distance toward the braking surface on the first friction member, said first peripheral tabs engaging said rotor when a thickness of the first friction member is worn to a predetermined thickness to provide an audible signal to inform an operator that should a first maximum reaction force be transmitted through the projections the first maximum reaction force may exceed a force that could deform the first plurality of projections thereon, said second shield having a second plurality of peripheral tabs that extend a fixed distance toward the braking surface on the second friction member, said second peripheral tabs engaging said rotor when a thickness of the second friction member is worn to a predetermined thickness to provide and audible signal to inform an operator that should a second maximum reaction force be transmitted through the projections the second maximum reaction force may exceed a force that could damage the second plurality of projections thereon.

2. The disc brake as recited in claim 1 wherein said second shield is further characterized by at least one of said plurality of tabs retaining a second sensor that closes an electric circuit on engagement with the rotor to activate a visual indicator through which an operator is informed of the thickness of said second friction member.

3. The disc brake as recited in claim 2 wherein said one of said plurality of tabs is located adjacent the first projection as defined by the leading edge of engagement of said second friction member with the rotor to assure that any maximum wear is sensed prior to a thickness of the projection being reduced to a thickness that may be crushed by the maximum reaction force.

4. A disc brake for a vehicle including an anchor fixed to a vehicle having a first rail with a first bore therein that is spaced apart and parallel from a second rail with a second bore therein, a caliper having a housing retained on the anchor by a first pin that extends from a first ear and a second pin that extend from a second ears on the housing to align a piston retained in a bore therein with the first and second bores and arms that extend from the housing and span the rotor in a perpendicular relationship with the first and second radial surface on the rotor, said bore receiving pressurized fluid from a source and acting on the piston to move a first friction member and a first braking surface thereon toward and into engagement with the first radial surface and acting on the housing to pull on the arms and move a second friction member and a second braking surface thereon toward and into engagement with the second radial surface to create a clamping force that acts on the rotor and transmits a reaction force into the anchor to oppose the rotation of the rotor during a brake application, said disc brake being characterized in that the first rail has a first groove therein that is parallel with the first bore and the second rail has a second groove therein the is parallel with the second bore; and in that the first and second friction members each have a first projection that is located in the first groove and a second projection that is located in the second groove through which the reaction force is carried into the anchor; and in that the said first and second braking surfaces each have a face on said first and second projections that engages the rotor on each brake application to oppose the rotation of the rotor, said first and second grooves and said first and second projections each have a semi-spherical shape through which the reaction force is transmitted from the first and second friction members into the anchor, said brake disc being further characterized by a first shield located between said piston and said first friction member, said first shield protecting said piston from wear caused by repeated engagements with the first friction member and a second shield located between said arms and said second friction member, said second shield protecting said arms from wear caused by repeated engagement with the second friction member, said first shield having a first plurality of peripheral tabs that extend a fixed distance toward the braking surface on the first friction member, said first peripheral tabs engaging said rotor when a thickness of the first friction member is worn to a predetermined thickness to provide an audible signal to inform an operator that should a maximum reaction force be transmitted through the projections it may exceed a force that could damage the first plurality of projections thereon, said first shield being further characterized by at least one of said first plurality of peripheral tabs retains a first sensor that closes an electrical circuit on engagement with the rotor to activate a visual indicator through which an operator is informed of the thickness of said first friction member.

5. The disc brake as recited in claim 4 wherein said one of said plurality of tabs is located adjacent said first projection as defined by the leading edge of engagement of said first friction member with the rotor to assure that any maximum wear is sensed prior to a thickness of the projection being reduced to a thickness that may be crushed by the maximum reaction force.

* * * * *